United States Patent [19]

Catey et al.

[11] Patent Number: 4,905,276
[45] Date of Patent: Feb. 27, 1990

[54] TELEPHONE EARPIECE EXTENSION ATTACHMENT

[76] Inventors: Harry Catey, 3330 91st St. Southeast, Everett, Wash. 98208; Erling C. Hesla, 3101 111th St. N.W., Ste. C, Everett, Wash. 98204

[21] Appl. No.: 207,348

[22] Filed: Jun. 15, 1988

[51] Int. Cl.⁴ .................... H04R 1/10; H04M 1/03
[52] U.S. Cl. ...................... 379/450; 379/441; 379/444; 379/447; 381/153; 381/158
[58] Field of Search ........... 379/450, 441, 443, 444, 379/447; 381/153, 158, 159; D14/57, 67, 59, 217, 243, 249

[56] References Cited

U.S. PATENT DOCUMENTS

| | | | |
|---|---|---|---|
| D. 181,667 | 12/1987 | Oyler | D14/67 |
| D. 227,476 | 6/1973 | Kennedy | D14/57 |
| D. 281,688 | 12/1985 | Owens, Jr. | D14/59 |
| 366,994 | 7/1887 | Bradford | 379/452 |
| 1,615,028 | 1/1927 | Morser | 379/447 |
| 2,236,568 | 4/1941 | Edson | 381/158 |
| 2,540,873 | 2/1951 | Florman | 381/158 |
| 2,544,267 | 3/1951 | Konvalinka | 379/450 |
| 2,697,761 | 12/1954 | Bodine, Jr. | 381/153 |
| 2,846,527 | 8/1958 | Heintzelman | 379/450 |
| 3,231,688 | 1/1966 | Ugartechea | 379/447 |
| 3,819,879 | 6/1974 | Baechtold | 381/158 |
| 4,185,175 | 1/1980 | Kondo et al. | 179/182 R |

FOREIGN PATENT DOCUMENTS

| | | | |
|---|---|---|---|
| 2831401 | 1/1980 | Fed. Rep. of Germany | 381/159 |
| 2542550 | 9/1984 | France | 381/159 |
| 212373 | 3/1924 | United Kingdom | 379/153 |
| 2154390 | 9/1985 | United Kingdom | 379/444 |

OTHER PUBLICATIONS

*Hearing Instruments*, "Telephone Ear Pad", product information from Hal-Hen, Co. Inc., Jan. 1985, p. 42.
Publication titled "PhonePal TM It Fights Feedback!", believed to have been distributed to the public by about Mar. 1988.
Advertising circular (2 pages) titled "PhonePal TM Telephone Listening Device for I.T.E. Hearing Aid Users", (Technical Data and Fact Sheet).

*Primary Examiner*—Jin F. Ng
*Assistant Examiner*—Danita R. Byrd
*Attorney, Agent, or Firm*—Ward Brown; Robert W. Beach

[57] ABSTRACT

The open end of a thin shell is snugly fitted over the earpiece of a standard telephone handset to secure the shell on the handset. Teeth or projections can extend inward from the sidewalls of the shell for snap-fit connection of the shell to the earpiece. The sidewalls of the shell project beyond the sound-emitting outer surface of the earpiece to an apertured outer surface of the shell against which the ear of a user can rest. The shell forms an extension attachment spacing the ear of a hearing aid wearer a distance from the earpiece sufficient to avoid generation of objectionable feedback sounds during use of the telephone.

9 Claims, 2 Drawing Sheets

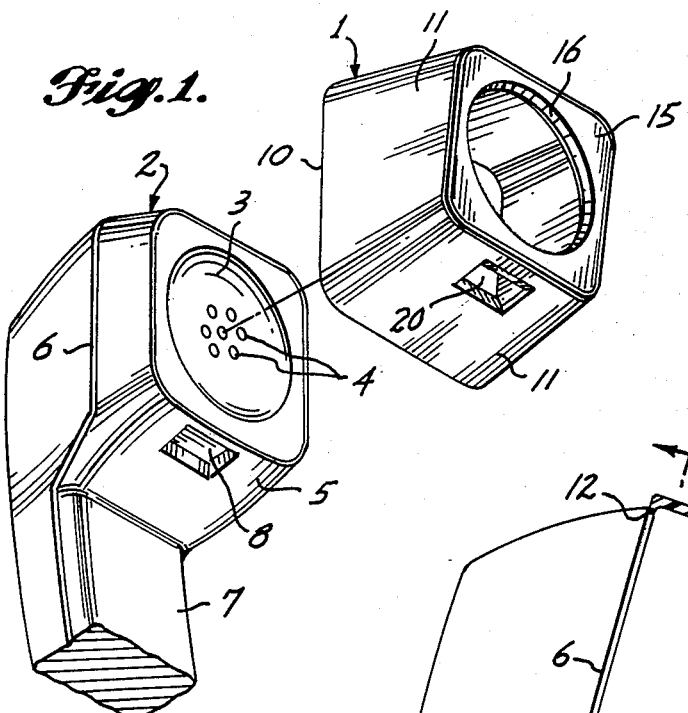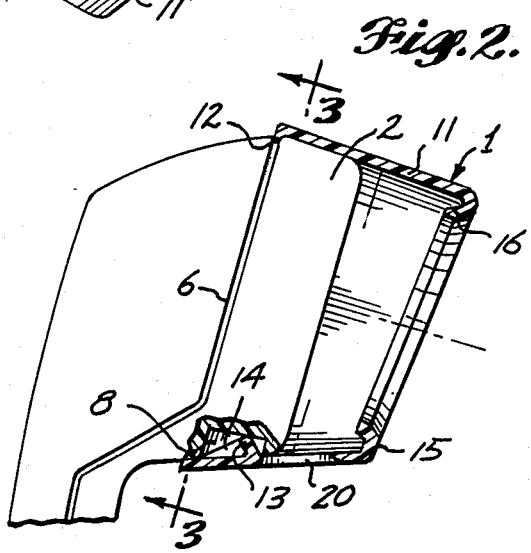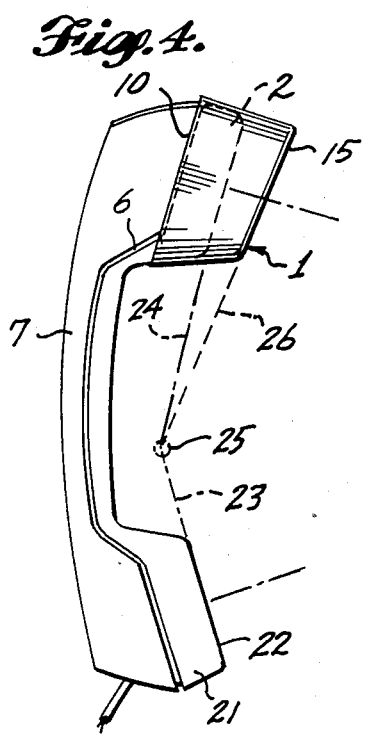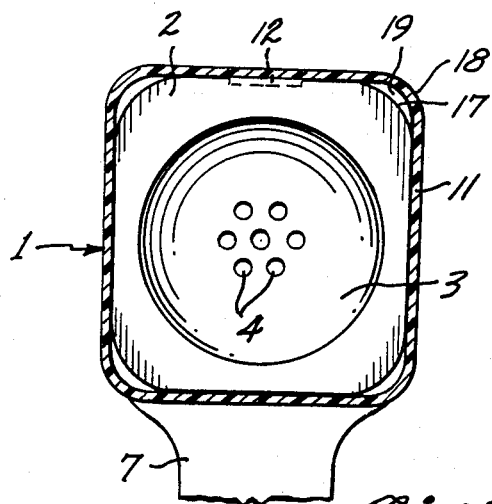

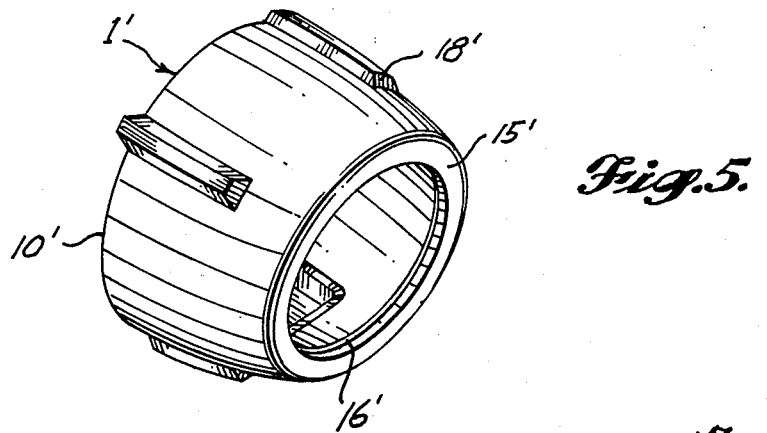
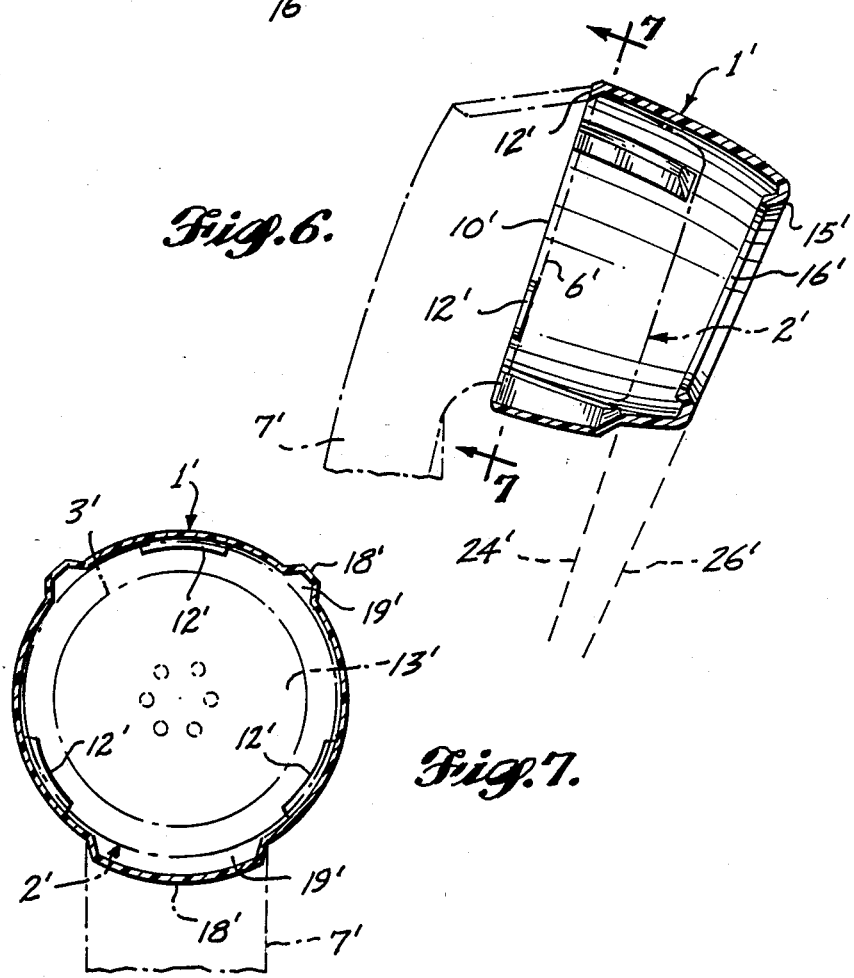

TELEPHONE EARPIECE EXTENSION ATTACHMENT

CROSS REFERENCE

This application is related to our U.S. Pat. application Ser. No. 049,076, filed May 12, 1987, now abandoned for Telephone Handset Adapter, and our U.S. Pat. application Ser. No. No. 207,349, filed June 15, 1988, for Telephone Earpiece Extension Attachment.

BACKGROUND OF THE INVENTION

Field of the Invention

The present invention relates to an extension attachment for the earpiece of a telephone to adapt the telephone for convenient and comfortable use by people with sound-amplifying hearing aids.

The Problem

An objectionable feedback screech, squeal or whistle can be generated when a sound-amplifying hearing aid is disposed close to another sound amplifying or generating component such as the earpiece of a telephone. The feedback sound can interfere with telephone communication, can be irritating to all parties to the telephone conversation and can be objectionable to others in the immediate area of the hearing aid wearer.

Prior Art

Kondo et al. U.S. Pat. No. 4,185,175 discloses a "Cushioned Extension for Telephone Earpiece" having a doubly cushioned arcuate portion designed to fit against the side of the user's head above the ear, but does not address the problem of hearing aid feedback.

SUMMARY OF THE INVENTION

The principal object of the present invention is to provide a novel device which will permit a hearing aid wearer to use a telephone without fear of generating an undesirable feedback squeal, screech or whistle.

An additional object is to provide such a device usable to adapt standard telephones quickly and easily without requiring any modifications to the telephones.

Another object is to provide such a device in compact, portable form and which may be uncoupled from the telephone quickly and easily so that the telephone can be quickly adapted for conventional use by other users.

A further object is to provide such a device which, when coupled to the telephone, results in minimal change in the ergonomic design such that use and positioning of the telephone handset is substantially the same for the hearing aid wearer when using the adapted telephone as for others using the unadapted telephone, and which does not significantly alter the appearance of the telephone handset.

It also is an object to provide such a device which will have minimal effect on the sound quality and which will not cause other acoustic problems.

In the preferred embodiment of the present invention the foregoing objects are accomplished by providing an extension attachment or adapter in the form of a thin shell of cross-sectional shape approximately the same as the cross-sectional shape of the telephone earpiece to be adapted. The shell has an open bottom end for close fitting over the telephone earpiece. The upper end of the shell has a large central aperture of approximately the same size as the sound-emitting dish of the telephone earpiece and a surrounding marginal portion against which the ear of the user can rest. The shell adapter is sized to space the ear of the wearer a desired distance from the telephone earpiece, sufficient to prevent generation of undesirable feedback sounds. The snug fit of the adapter on the telephone earpiece retains it in position, but preferably snap-fit teeth or projections are provided to engage in grooves or notches of standard handset earpieces. The outer face of the adapter preferably is angled downward and inward toward the central handle of the handset such that the mouthpiece of the handset will be at approximately the same position for the adapted handset, when placed to the ear, as an unadapted handset. Air vents are provided to minimize the "seashell" acoustic effect of surrounding the ear by a closed-walled extension.

BRIEF DESCRIPTION OF THE DRAWINGS

FIG. 1 is a bottom perspective of the upper portion of a standard telephone and an earpiece extension attachment in accordance with the present invention with the earpiece and attachment in unassembled relationship.

FIG. 2 is a side elevation of the telephone earpiece portion and extension attachment in accordance with the present invention in assembled relationship and with parts broken away.

FIG. 3 is a section along line 3—3 of FIG. 2.

FIG. 4 is a somewhat diagrammatic, reduced scale, side elevation of the entire telephone handset of the general design shown in FIG. 1 with an attachment in accordance with the present invention attached.

FIG. 5 is a top perspective of a modified telephone handset extension attachment in accordance with the present invention designed for use with a different style of telephone handset.

FIG. 6 is a somewhat diagrammatic side elevation of the attachment of FIG. 5 with parts broken away and illustrating the upper portion of a telephone handset in broken lines.

FIG. 7 is a section along line 7—7 of FIG. 6.

DETAILED DESCRIPTION

With reference to FIG. 1, the telephone earpiece extension attachment or adapter in accordance with the present invention is a thin plastic shell 1 of approximately the same cross-sectional shape as the telephone earpiece 2 with which it is intended to be used. In the form shown in FIGS. 1 through 4, such earpiece is approximately square and has an outer face with a dished central portion 3 having holes 4 through which the sound generated inside the earpiece is emitted. The surrounding sidewalls 5 of the earpiece are angled inward toward its outer face. In the standard design shown, there is a groove 6 extending along opposite sides of the handle 7 and upward along the opposite sides of the earpiece 2. Such groove also extends along the top of the earpiece, that is, along the side opposite the central handle 7. In addition, a large notch or cutout 8 is formed on the underside of the earpiece close to its outer, sound-emitting face.

The adapter shell 1 has an open bottom 10 sized and shaped to fit snugly over the earpiece 2. The sidewall portions 11 of the adapter shell are angled upward and inward from the open bottom 10 at approximately the same angle as the angle of the earpiece sidewalls 5. With reference to FIG. 2, the snug friction fit of the shell 1 over the earpiece may be sufficient to retain it in position, but preferably the shell is provided with a thin inward-projecting tooth 12 at the top for reception in the earpiece groove 6. The bottom wall of the adapter shell has an inward-extending projection means to be received in the earpiece bottom notch 8. Such projection means include a projection 13 having a top surface angled toward the open or bottom end 10 of the adapter and triangular gussets 14 at the other side to provide rigidity and have inner edges angled oppositely from the top surface of the projection. Such edges 14 gradually wedge the bottom wall of the adapter shell outward as it is fitted over the telephone earpiece until such wall snaps inward when the projection 13 is received in the notch 8. Similarly, the angled construction of the top surface of projection 13 causes a gradual outward wedging action of the bottom wall of the adapter when it is manually pulled away from the earpiece for easy detachment, although it is normally held securely in position by reception of the tooth and projection 12 and 13 in the groove and notch 6 and 8.

The top or outer surface 15 of the adapter has a central hole 16 approximately the same size as and positioned substantially directly over the dished portion 3 of the handset earpiece 2. Surface 15 is essentially flat and sufficiently wide for comfortable engagement against the ear. As best seen in FIG. 2, the marginal portion of surface 15 surrounding the central hole 16 is beveled or rounded inward to a return bent condition so that there is no sharp edge or point to catch on or irritate the ear of the user.

As seen in FIG. 3, the radius of curvature at the corners 17 of the standard handset earpiece 2 is substantially greater than the radius of curvature at the corners 18 of the adapter shell 1, leaving open air passages or vents 19 extending from the interior of the shell 1 to its open bottom 10. Such vents help to reduce the "seashell" acoustic effect, that is, the rushing noise that can be heard if the ear is pressed against the opening of a hollow object. As seen in FIGS. 1 and 2, an additional vent or hole 20 is provided in the bottom wall of the adapter immediately above the latching projection 13 which increases the venting. Nevertheless, hole 20 is provided primarily so that the user can easily orient the adapter with respect to top and bottom.

Proper orientation of the adapter on the telephone earpiece is required not only so that the larger projection 13 will fit in the notch 8, but also because the adapter is designed to approximately match the ergonomic design of the handset earpiece 2 with respect to the mouthpiece 21, as illustrated in FIG. 4. In the standard construction illustrated, the outer surface 22 of the mouthpiece defines a plane 23 inclined slightly inward toward the handle section 7 and the outer surface of the earpiece 2 defines a plane 24 inclined slightly inward. Such two planes meet at a line of intersection 25. In accordance with the present invention, with the adapter 1 fitted on the earpiece 2, the plane 26 defined by the flat outer surface 15 of the adapter is angled more sharply inward than the plane 24 so as to meet the plane 23 at approximately the same line of intersection 25. The result is that, with the user's ear pressed comfortably against the outer surface of the adapter, the mouth of the user is positioned approximately the same as it would be if the adapter were removed and the ear were pressed against the unadapted handset earpiece 2.

For a hearing aid wearer, the spacing of the ear from the telephone earpiece achieved by use of the extension attachment or adapter in accordance with the present invention is all that is required to eliminate the undesirable feedback screech, squeal or whistle which otherwise can occur if the ear is placed too close to the telephone earpiece. The adapter can be conveniently detached for use on another telephone, although it can be left on the earpiece because it does not significantly interfere with convenient use of the telephone by others.

The embodiment shown in FIGS. 5, 6 and 7 is modified to accommodate a different standard style of telephone, namely, a telephone having a round earpiece. With reference to FIGS. 6 and 7, the outer portion 2' of the standard round earpiece is formed as a screw cap, leaving a continuous peripheral groove represented as the broken line 6' in FIG. 6. The modified adapter shell 1' for use on the round earpiece is of generally circular cross section and decreases in diameter outward from its open bottom 10' to its outer face 15' approximately the same as the outward tapering of the earpiece cap 2'. With reference to FIGS. 6 and 7, the open bottom portion of the earpiece shell is provided with three equiangularly spaced inward-extending teeth 12' to be received in the peripheral groove 6' in essentially snap-fit engagement.

Venting from the hollow interior of the shell 1' to the open bottom 10' of the adapter shell 1' is provided by outwardly stepped sections 18' forming unobstructed air passages 19' as best seen in FIG. 7. Preferably, one such stepped section 18' is substantially larger than the others and is approximately the same width as and centered over the handle portion 7' of the handset to form a locating or indexing projection for easy orientation of the adapter shell 1' with respect to the earpiece. As best seen in FIG. 6, the outer surface 15' of the earpiece defines a plane 26' angled downward and inward more sharply than the plane 24' defined by the outer surface of the earpiece 2'. Plane 26' preferably intersects plane 24' at approximately the same location as the plane defined by the handset mouthpiece.

Similar to the previously described construction, the outer surface 15' of the modified adapter 1' has a large central hole 16' of approximately the same size as the dished portion 3' of the earpiece 2'. The marginal portion of surface 15' around such hole is beveled or rounded inward forming a return bent portion with no sharp edges.

As for the previously described embodiment, the extension attachment or adapter shown in FIGS. 5, 6 and 7 can be easily fitted over the earpiece 2'. Such adapter will be retained by the snap-fit connection of the teeth 12' in groove 6' but can be manually removed quickly and easily. The adapter spaces the users ear from the earpiece a distance sufficient to avoid generation of feedback sounds but does not appreciably interfere with normal use of the telephone.

We claim:

1. An extension attachment for a telephone earpiece having a sound-emitting surface, which attachment comprises a thin shell having an open end and sidewall portions sized and shaped to fit snugly over the earpiece, said shell having an outer face remote from said open end and positioned by said sidewall portions so as to be spaced outward from the earpiece sound-emitting surface when said shell is fitted over the earpiece, said outer face having an aperture for substantially unrestricted transmission of sound from the earpiece sound-emitting surface through said shell and through said aperture, said shell including vent means forming unrestricted air passages from the interior of said shell to the exterior thereof other than through said aperture.

2. The attachment defined in claim 1, in which the vent means form unrestricted air passages from the interior of the shell to the open end thereof alongside the earpiece.

3. An extension attachment for a telephone earpiece having a sound-emitting surface and a notch adjacent to such surface, which attachment comprises a thin shell having an open end and sidewall portions sized and shaped to fit snugly over the earpiece, said shell having an outer face remote from said open end and positioned by said sidewalls so as to be spaced outward from the earpiece sound-emitting surface when said shell is fitted over the earpiece, said outer face having an aperture for substantially unrestricted transmission of sound from the earpiece sound-emitting surface through said shell and through said aperture, said shell including a projection means extending inward of one of said sidewall portions of said shell, said projection means including triangular gussets and a projection with an angled surface, each triangular gusset having angular surfaces, wherein the angular surfaces of the triangular gussets wedge the one said sidewall portion away from the adjacent portion of the earpiece when the shell is fitted over the earpiece and wherein the angular surface of the projection wedges said one sidewall portion away from the adjacent portion of the earpiece when the shell is removed from the earpiece, and wherein the projection means are positioned to fit snugly in such notch in a substantially snap-fit engagement.

4. The attachment defined in claim 3, in which the shell includes vent means forming unrestricted air passages from the interior of the shell to the exterior thereof other than through the aperture.

5. The attachment defined in claim 4, in which the vent means form unrestricted air passages rom the interior of the shell to the open end thereof alongside the earpiece.

6. An extension attachment for a telephone handset having a handle and an earpiece carried by the handle, such earpiece having a sound-emitting surface, which attachment comprises a thin shell having an open end and sidewall portions sized and shaped to fit snugly over the earpiece, said shell having an outer face remote from said open end and positioned by said sidewalls so as to be spaced outward from the earpiece soundemitting surface when said shell is fitted over the earpiece, said outer face having an aperture for substantially unrestricted transmission of sound from the earpiece soundemitting surface through said shell and through said aperture, a sidewall portion of said shell having a hole positioned to be aligned with the telephone handset handle to achieve a selective orientation of said shell relative to the earpiece when said shell is fitted over the earpiece, said sidewall portion having a portion extending inwardly from alongside said hole.

7. The attachment defined in claim 6, in which the earpiece sound-emitting surface defines a first plane and the outer face of the shell, when the shell is fitted over the earpiece, defines a second plane angled more sharply toward the handset handle than the first plane.

8. An extension attachment for a telephone handset having a handle and an earpiece carried by the handle, such earpiece having a sound-emitting surface, which attachment comprises a thin shell having an open end and sidewall portions sized and shaped to fit snugly over the earpiece, said shell having an outer face remote from said open end and positioned by said sidewalls so as to be spaced outward from the earpiece soundemitting surface when said shell is fitted over the earpiece, said outer face having an aperture for substantially unrestricted transmission of sound from the earpiece soundemitting surface through said shell and through said aperture, one of said sidewall portions of said shell having an indexing projection extending outward from the remainder of such sidewall portion of said shell, said indexing projection being positioned to be aligned with the handset handle when said shell is fitted over the earpiece to achieve a selected orientation of said shell relative to the earpiece.

9. The attachment defined in claim 8, in which the earpiece sound-emitting surface defines a first plane and the outer face of the shell, when the shell is fitted over the earpiece in the selected orientation, defines a second plane angled more sharply toward the handset handle than said first plane.

* * * * *